March 26, 1963     G. STEINLEIN     3,082,636
V-BELT DRIVE TRANSMISSION
Filed May 11, 1961
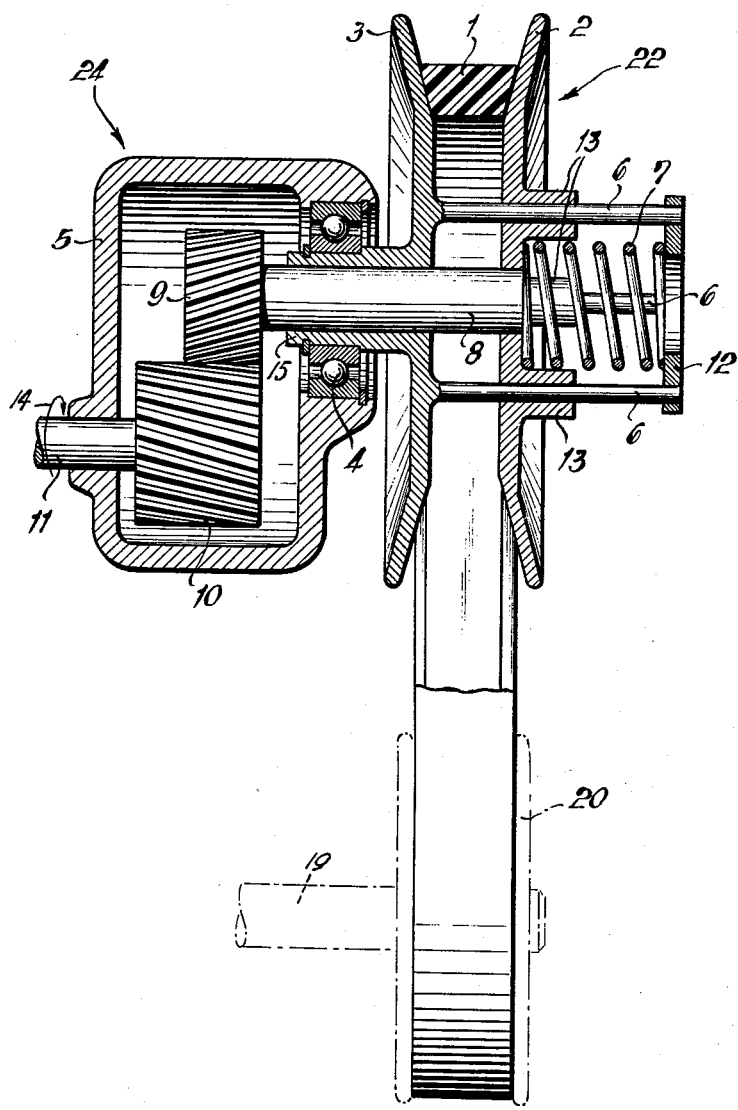
INVENTOR
Gustav Steinlein

# United States Patent Office 3,082,636
Patented Mar. 26, 1963

3,082,636
V-BELT DRIVE TRANSMISSION
Gustav Steinlein, Forsthaus, Mainberg, near Schweinfurt, Germany, assignor to Fichtel & Sachs A.G., Schweinfurt am Main, Germany, a corporation of Germany
Filed May 11, 1961, Ser. No. 109,311
Claims priority, application Germany May 17, 1960
5 Claims. (Cl. 74—230.17)

This invention relates to V-belt drive transmissions, and more particularly to a V-belt drive transmission with steplessly variable transmission ratio.

In known steplessly variable V-belt transmissions, a belt is trained over two V-grooved pulleys, each constituted by two discs having opposite axially tapering belt engaging faces. The discs of one pulley are permanently urged axially toward each other by a spring, and the axial spacing of the discs of the other pulley is controlled according to the desired transmission ratio. When the discs of the controlled pulley are moved apart, the belt travels over a path of smaller radius. The resulting slack of the belt permits the discs of the other pulley to be moved closer toward each other under the urging of the spring so that the effective diameter of the other pulley increases and the movement of the other pulley relative to the controlled pulley is slowed down.

The axial movement of the discs of the controlled pulley may be made dependent from the torque transmitted by the transmission arrangement in such a manner that an increase in torque transmitted will automatically result in a decrease in the transmission ratio between an input and an output shaft. In known automatic devices of this type, the two discs of the controlled pulley are connected by a threaded connection or a cam connection which simultaneously rotates the discs relative to each other while displacing them axially.

The known arrangements are not capable of reliably transmitting torque while the two discs rotate relative to each other. The relative rotation of the discs inherently involves relative movement of the belt and at least one of the discs. Where the transmission changes are frequent, as in a transmission interposed between the driving engine and the driven wheels of a road vehicle, the uncertainty of coaction between the engine and the wheels during the change of speed or transmission ratio is undesirable, and may be intolerable. The additional belt wear caused by movement of a disc relative to the belt during speed changes significantly and undesirably affects the economics and reliability of the known steplessly variable torque-responding V-belt drives in vehicles and in similar applications.

It is the primary object of this invention to provide a V-belt drive transmission with infinitely and steplessly variable transmission ratio in which relative rotary movements of the discs of the controlled pulley and of the belt trained over it are safely avoided.

With this and other objects in view, the invention in its more specific aspects provides a V-belt transmission in which a V-belt is trained over two rotatable pulleys, at least one of which consists of two coaxial discs which jointly define a V-groove for the belt, and are secured against rotation relative to each other. The transmission further includes helical gearing, one helical gear member of which is rotatable and axially movable on a support, and connected to one of the discs for actuating joint rotation of the gear member and of the discs, and for actuating relative axial movement of the discs when the gear member axially moves on the support.

Other features and many of the attendant advantages of this invention will be readily appreciated as the same becomes better understood by reference to the following detailed description when considered in connection with the accompanying drawing in which the sole FIGURE shows a preferred embodiment of the invention in partly sectional elevation.

A housing 5, which is part of a support structure not otherwise shown, encloses a gear transmission 24 the shaft 11 of which constitutes the output shaft of the drive arrangement illustrated. The gearing of the transmission 24 consists of two helical gears 9 and 10 of which the latter is fixedly mounted on the shaft 11 and axially secured relative to the housing 5 in a conventional manner not further illustrated, such as by a thrust bearing mounted on the support structure.

The helical gear 9, the axial length of which is smaller than that of the gear 10 with which it is in meshing engagement, is mounted on an intermediate shaft 8 that is rotatable in a hub portion 15 of a V-belt pulley 22. The shaft 8 carrying the gear 9 is axially slidable in an axial bore of the hub portion 15 while meshing engagement between the gears 9 and 10 is maintained. The hub portion 15 is journaled in a ball bearing 4 on the housing 5, which holds the hub portion in a fixed axial position.

The hub portion 15 is an integral part of a disc 3 which together with a disc 2 constitutes the pulley 22. The discs define a V-groove between respective coaxial conical belt-receiving faces, in which a V-belt 1 is engaged. The disc 3 is axially nonmovable and carries guide pins 6 parallel with the common axis of the pulley 22, the shaft 8, and the gear 9, on which the axially movable disc 2 of the pulley 22 is slidable. The guide pins 6 are received in tubular reinforcing studs 13 of the disc 2 and their free axial ends are joined by a disc shaped yoke 12 so that the pulley discs 2 and 3 are secured against relative rotation about the common axis.

A helical spring 7 is interposed between the yoke 12 and the disc 2 and urges the axially movable disc 2 toward the axially fixed disc 3. The movable disc 2 is fixedly fastened to the shaft 8.

The belt 1 is also trained over a conventional axially split V-belt pulley 20 the two halves of which (not separately shown) are urged toward each other in an axial direction by a spring (not shown) so as to vary the effective diameter of the pulley 20 in response to the tension of the belt 1 in a manner well known in itself. The arrangement may be the same as shown in detail with respect to pulley 22, but many types of conventional split pulleys will be satisfactory. The pulley 20 is keyed or otherwise secured against rotation on an input shaft 19 journaled in the support structure in a manner well known and not illustrated for that reason.

The operation of the apparatus will now be described under the assumption that the shaft 19 is connected to a source of rotary motion from which torque is transmitted to the output shaft 11 to rotate the same in the direction of the arrow 14 against the restraint of a load such as the wheels of a vehicle.

Rotation is transmitted to the output shaft 11 from the pulley 22 by the belt 1. The gear 9 rotates in unison with the pulley 22 and drives the output shaft 11 by means of the gear 10. The resistance of the load connected to the shaft 11 generates axial forces in the axially movable gear 9 as the meshing gears rotate. With the teeth of the gears 9 and 10 slanted as indicated in the drawing, rotation of the shaft 11 in the normal direction which is indicated by the arrow 14 causes an axial force to be set up in the gear 9, which tends to shift the shaft 8 more or less away from the disc 2, depending on the load moment of the output shaft 11, developed by the driving resistance of a vehicle.

Movement of the shaft 8 away from the disc 2 or inward of the housing 5 causes the discs 2 and 3 to move axially toward each other, whereby the belt 1 is displaced radially outward of the V-groove of the pulley 22. This results in an increase of the effective diameter of the pulley 22, and in increase of the turning moment transmitted to the output pulley. Because of the wedging engagement of the belt 1 with the discs 2, 3, and the actions of the several springs in the belt transmission, a condition of equilibrium is eventually reached for all torques within the effective operating range of the apparatus in which the transmission ratio is uniquely correlated to the load applied to the output shaft 11.

The apparatus illustrated in the drawing may be modified in a very simple manner to permit the shaft 11 to operate as an input shaft and the shaft 19 to be connected to a load. The necessary changes will be apparent to those skilled in mechanical engineering.

Obviously many other modifications and variations of the present invention are possible in the light of the above teachings. It is therefore to be understood that within the scope of the amended claims, the invention may be practiced otherwise than as specifically described.

What I claim and desire to be protected by Letters Patent of the United States is:

1. In a V-belt drive transmission, in combination:
   (a) a support;
   (b) two shafts rotatable on said support about respective parallel axes, one of said shafts being axially movable relative to said support;
   (c) two helical gear members respectively fixedly fastened to said shafts in meshing engagement with each other for transmission of torque between said gear members and for axially moving said one shaft normally in one direction and to an extent responsive to the torque transmitted;
   (d) two discs coaxial with said one shaft and having respective opposite conical faces, said faces defining an annular V-groove therebetween, one of said discs being fixedly fastened to said one shaft, and the other disc being rotatable on said support and secured thereon against axial movement;
   (e) resilient means permanently urging said one disc to move toward said other disc;
   (f) guide means for securing said discs against relative rotation about the common axis;
   (g) a rotatable pulley; and
   (h) a V-belt trained over said pulley and said V-groove.

2. In a drive transmission as set forth in claim 1 said other disc being rotatable on said one shaft.

3. In a drive transmission as set forth in claim 1, said other disc being formed with an axial opening, said one shaft being rotatable and axially movable in said opening.

4. In a drive transmission as set forth in claim 1, said gear members having respective axially extending meshing faces, the meshing face of one of said gear members being longer in an axial direction than that of the other member.

5. In a drive transmission as set forth in claim 1, said guide means including axially extending members mounted on said other disc and movably engaging said one disc for actuating rotation of said other disc when said one disc rotates while permitting relative axial movement of said discs.

References Cited in the file of this patent

UNITED STATES PATENTS

| | | |
|---|---|---|
| 2,651,210 | Clark | Sept. 8, 1953 |
| 2,658,399 | Mercier | Nov. 10, 1953 |
| 2,995,295 | Day | Aug. 8, 1961 |